May 26, 1953 — A. B. WISER — 2,639,629

TRANSMISSION

Filed Jan. 7, 1949 — 2 Sheets-Sheet 1

INVENTOR:
ARTHUR B. WISER
BY HIS ATTORNEYS
HARRIS, KIECH, FOSTER & HARRIS

INVENTOR:
ARTHUR B. WISER
BY HIS ATTORNEYS
HARRIS, KIECH, FOSTER & HARRIS

Patented May 26, 1953

2,639,629

UNITED STATES PATENT OFFICE 2,639,629

TRANSMISSION

Arthur B. Wiser, Los Angeles, Calif.

Application January 7, 1949, Serial No. 69,732

3 Claims. (Cl. 74—687)

My invention relates in general to variable speed transmissions, i. e., transmissions for varying ratios between input and output speeds, and, more particularly, to variable speed transmissions of the type which includes normally unrestrained gearing incapable of transmitting torque and which includes means for restraining such gearing to effect torque transmission, a primary object of the present invention being to provide an improved variable speed transmission of this type.

More specifically, a primary object of the invention is to provide a transmission capable of producing an infinite number of output speeds ranging from zero to speeds in excess of input speed in either direction.

An important object of the invention is to provide such a transmission having dynamic, rather than static, means for restraining the aforementioned gearing.

Another object is to provide a transmission wherein the aforementioned dynamic restraining means is actuable by dynamic, rather than static, fluid. More specifically, it is an object to provide a restraining means actuable hydraulically by a stream of fluid.

A further object is to provide a transmission which includes a main gear, a rotor rotatable relative to the main gear, an auxiliary gear carried by the rotor and meshed with the main gear, a turbine connected to the rotor and actuable by a stream of fluid, and means for delivering a stream of fluid to the turbine.

Still another object is to provide a transmission which includes a driving gear, a driven gear rotatable relative to the driving gear, a normally unrestrained rotor, gear means carried by the rotor and meshed with the driving and driven gears and adapted to communicate rotational movement of the driving gear to the rotor, a turbine connected to the rotor and actuable by a stream of fluid to restrain the rotor, and means for delivering a stream of fluid to the turbine.

A transmission conforming structurally to the foregoing objects is capable of varying its output speed from zero to speeds in excess of its input speed in infinitesimal increments, which is an important feature of the invention. It will be noted that since output speeds in excess of input speeds are attainable, the invention provides an extremely desirable feature in that the transmission of the invention provides, in effect, an overdrive having particular utility in automotive installations, although not limited thereto.

Still another object of the invention is to provide a transmission of the foregoing character having means for producing rotation of the driven gear in either direction, i. e., either forward or reverse.

Another important object of the invention is to provide a transmission wherein the means for delivering a stream of fluid to the turbine includes a pump which is operatively connected to the driving gear so that the power required for operating the pump is derived from the motivating agent, e. g., an automobile engine, which operates the driving gear.

Still another important object of the invention is to provide a transmission having means for varying the magnitude of a stream of fluid delivered by the pump so as to vary the amount of dynamic restraint imposed on the rotor through the turbine connected thereto, whereby to vary the output speed of the transmission relative to the input speed thereof.

Another object is to provide a transmission wherein the aforementioned control means for varying the magnitude of the stream of fluid comprises valve means for controlling the inlet of the pump.

Another object is to provide a transmission having means for rigidly connecting the driving and driven gears to prevent free wheeling whenever desired.

Another object is to provide a transmission having means for selectively preventing free wheeling of the driven gear with respect to the driving gear, or reversing the direction of rotation of the driven gear with respect to the driving gear.

The foregoing objects of the present invention and the advantages suggested thereby, together with various other objects and advantages thereof which will become apparent, may be attained through the employment of the exemplary embodiments of the invention which are illustrated in the accompanying drawings and which are described in detail hereinafter. Referring to the drawings.

Figure 1:
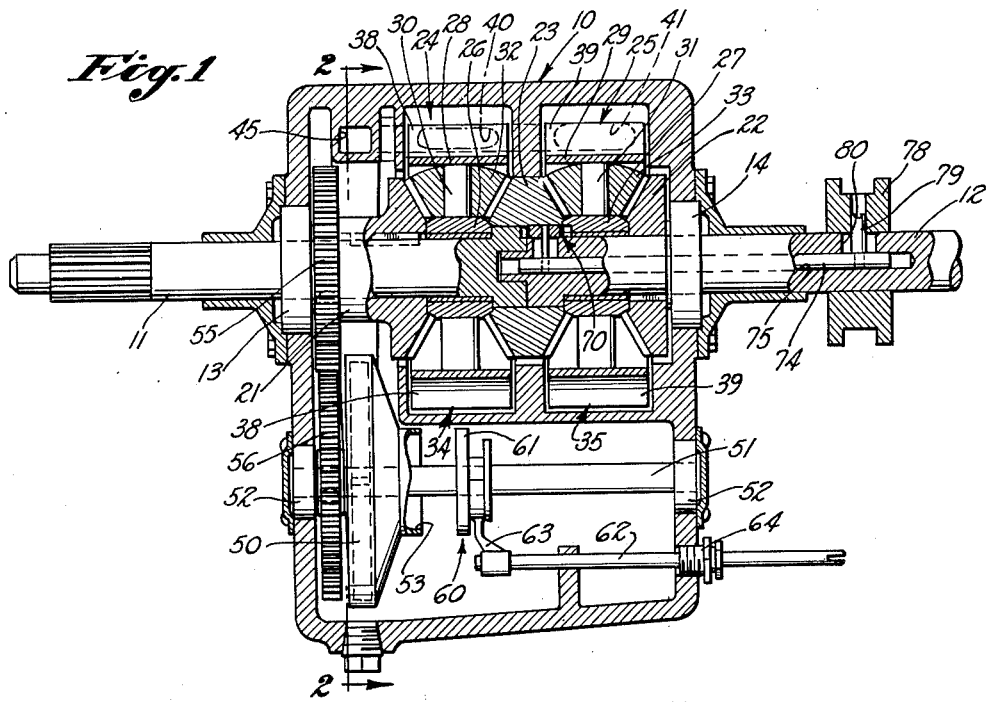
Fig. 1 is a longitudinal sectional view of a transmission which embodies the invention.

Referring particularly to Fig. 1 of the drawings, the embodiment illustrated therein includes a transmission case or housing 10 and includes driving and driven shafts 11 and 12 which are rotatably mounted in the housing by means of bearings 13 and 14. The driving and driven shafts are axially aligned and are rotatable relative to each other, the driven shaft having at one end thereof a cylindrical projection 15 which is journalled in a bore 16 in one end of the driving shaft. The driving shaft 11 is adapted to be operatively connected to any suitable motivating agent, such as an automobile motor, and the driven shaft 12 is adapted to be connected to a mechanism to be driven, such as the propeller shaft leading to the differential and rear wheels of an automobile.

Fixed on the driving shaft 11 is a driving gear 21 and fixed on the driven shaft 12 and spaced from the driving gear 21 is a driven gear 22, the gears 21 and 22 being bevel gears in the particular construction illustrated. Rotatable on the driving and driven shafts 11 and 12 at their junction and located intermediate the driving and driven gears 21 and 22 is a double-bevel gear 23 which is referred to hereinafter as an intermediate gear. Rotatable on the driving shaft 11 intermediate the gears 21 and 23 is a first rotor 24, and rotatable on the driven shaft 12 intermediate the gears 22 and 23 is a second rotor 25.

The rotors 24 and 25 are respectively provided with hubs 26 and 27 to which are connected annular rims 28 and 29, and are respectively provided with a plurality of radial shafts 30 and 31 which extend between the hubs and rims thereof. Rotatable on each of the radial shafts 30 of the rotor 24 and meshed with the driving gear 21 and the intermediate gear 23 is a pinion 32, and rotatable on each of the radial shafts 31 of the rotor 25 and meshed with the intermediate gear 23 and the driven gear 22 is a pinion 33.

Considering the operation of the transmission as thus far described, it will be apparent that rotation of the driving gear 21 in either direction will tend to produce rotation of the rotor 24 in the direction of rotation of the driving gear unless rotation of the rotor 24 is opposed. In other words, unless rotation of the rotor 24 is opposed, the pinions 32, which are rotated about their shafts 30 by the driving gear, will react against the intermediate gear 23 to rotate the rotor 24 in the direction of rotation of the driving gear. However, if rotation of the rotor 24 in the direction of rotation of the driving gear 21 is prevented, or if the speed of such rotation is reduced, the intermediate gear 23 will rotate in a direction opposite to the direction of rotation of the driving gear. With the particular construction illustrated, if the rotor 24 is restrained to such an extent that it rotates in the direction of rotation of a driving gear 21 at a speed less than that of the driving gear, the intermediate gear 23 will be driven in the opposite direction at a speed less than that of the driving gear. Similarly, if rotation of the rotor 24 in the direction of rotation of the driving gear 21 is prevented, i. e., if the rotor 24 is held stationary, the intermediate gear 23 will rotate at the same speed as the driving gear 21, but in the opposite direction. Carrying the analysis further, if the rotor 24 is rotated in a direction opposite to the direction of rotation of the driving gear 21, the intermediate gear 23 will rotate in a direction opposite to the direction of rotation of the driving gear and at a speed in excess of the speed of the driving gear, which is an important feature of the present invention.

As will be apparent, a similar relationship obtains between the intermediate gear 23, the rotor 25 and the driven gear 22. In other words, if the intermediate gear 23 is rotated in a direction opposite to the direction of rotation of the driving gear 21 in the foregoing manner, and if rotation of the second rotor 25 is unopposed, the second rotor will rotate in a direction opposite to the direction of rotation of the driving gear 21 and the driven gear 22 will remain stationary. Similarly, if rotation of the rotor 25 is retarded or prevented, the driven gear 22 will be rotated in the direction of rotation of the driving gear 21 at speeds respectively less than or equal to the speed of the intermediate gear 23. Also, if rotation of the rotor 25 is not only prevented but is reversed, i. e., if the rotor 25 is caused to rotate in the direction of rotation of the driving gear 21, the driven gear 22 will be caused to rotate in the direction of rotation of the driving gear 21 at a speed in excess of the speed of rotation of the intermediate gear 23, which is an important feature of the invention.

Thus, in the final analysis, if the rotors 24 and 25 are permitted to rotate without restraint, rotation of the driving shaft 11 will not be communicated to the driven shaft 12. However, if the rotors 24 and 25 are restrained, but not held stationary, the driven shaft 12 will rotate in the direction of rotation of the driving shaft 11 but at a speed less than that of the driving shaft. Similarly, if the rotors 24 and 25 are held stationary, the driven shaft 12 will be rotated in the direction of rotation of the driving shaft 11 and at the same speed. Also, if the normal directions of rotation of the rotor 24 and 25 are reversed, the driven shaft 12 will be caused to rotate in the direction of rotation of the driving shaft 11 and at a speed in excess of the speed of the driving shaft, thereby providing an overdrive, which is an important feature of the invention. It will be apparent that in order to obtain a higher speed for the driven shaft 12, it is not necessary that the directions of normal rotation of both the rotors 24 and 25 be reversed, since the same effect can be obtained with one of the rotors stationary, or with it rotating at reduced speed in its normal direction of rotation, by rotating the other rotor in reverse at a sufficiently high speed. However, it is preferable, although not necessary, that the two rotors operate alike.

Figure 2:
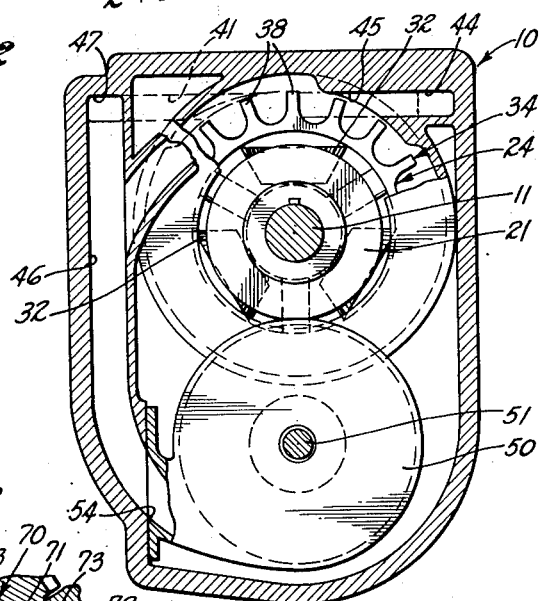
Fig. 2 is a transverse sectional view taken along the broken line 2—2 of Fig. 1.

As indicated previously, the present invention contemplates operatively connecting turbines 34 and 35 to the respective rotors 24 and 25 and employing fluid streams to operate the turbines so as to retard rotation of the rotors in their normal directions of rotation, to prevent rotation of the rotors in directions opposite to their normal directions of rotation. As best shown in Figs. 1 and 2 of the drawings, in the particular embodiment under consideration the turbines 34 and 35 respectively comprise blades or vanes 38 and 39 on the annular rims 28 and 29. The fluid streams are directed against the vanes 38 and 39 in directions opposite to the normal directions of rotation of the rotors 24 and 25 by nozzles 40 and 41. It will be noted that the nozzle 40 for the vanes 38 on the rotor 24 has been superimposed on Fig. 1 of the drawings in phantom to illustrate its position relative to the rotor 24. The nozzle 40 communicates with a longitudinal passage 44 which communicates with a transverse passage 45 extending across the housing 10, the passage 45 in turn communicating with the passage 46. The nozzle 41 communicates with a longitudinal passage 47 which communicates with the passage 46.

Fluid is delivered to the nozzles 40 and 41 through the foregoing passages by a pump 50 which is mounted in the housing 10 and which is of the centrifugal type, the rotor (not shown) of the pump being fixed on a shaft 51 which is carried by bearings 52. The pump is provided with an axial inlet 53 through which fluid from the housing 10 may enter the pump, and is provided with a radial outlet 54 which, as best shown in Fig. 2 of the drawings, communicates with the aforementioned passage 46 leading to the nozzles 40 and 41 through the intervening passages. Any suitable fluid, such as hydraulic fluid, lubricating oil, or the like, may be employed, and the level of such fluid is preferably maintained above the inlet 53 of the pump.

The pump 50 is actuated by gearing which interconnects the driving shaft 11 and the pump shaft 51, such gearing comprising a spur gear 55 fixed on the driving shaft and a spur gear 56 fixed on the pump shaft. Thus, it will be apparent that rotation of the driving shaft 11 will operate the pump 50 to deliver fluid to the nozzles 40 and 41, the latter directing streams of fluid against the vanes 38 and 39 on the rotors 24 and 25 to retard, prevent, or reverse normal rotation of the rotors to vary the speed of the driven shaft 12 relative to that of the driving shaft 11.

As will be apparent, the extent to which normal rotation of the rotors 24 and 25 is retarded or reversed, and, thus, the speed of the driven shaft 12 relative to that of the driving shaft 11, depend on the magnitude or power of the streams of fluid emanating from the nozzles 40 and 41 and directed against the vanes 38 and 39 of the turbines 34 and 35.

In order to permit varying the magnitudes of the fluid streams, and thus to permit varying the ratio of the speeds of the shafts 11 and 12, I provide, in the particular embodiments illustrated, valve means 60 for varying the rate at which fluid enters the inlet 53 of the pump 50. The valve means 60 is shown as comprising the valve member 61 which is slidable on the pump shaft 51 to open and close the inlet 53 of the pump 50, whereby to vary the rate of flow of fluid into the pump and, ultimately, the ratio of the speeds of the shafts 11 and 12, which is an important feature of the invention. In the particular construction illustrated, the valve member 61 is controlled by a slidable rod 62 through a yoke 63, the rod 62 extending into the housing 10 through a packing gland 64.

Considering the operation of the valve means 60 in more detail, it will be assumed that the operator desires to prevent torque transmission from the shaft 11 to the driven shaft 12, in which case the operator moves the valve member 61 to the left, as viewed in Fig. 1 of the drawings, until it closes the pump inlet 53. Consequently, no fluid will be delivered to the turbines 34 and 35 so that the rotors 24 and 25 are unrestrained. Consequently, no torque will be transmitted from the driving gear 21 to the driven gear 22. Thus, it will be apparent that the valve means 60 provides, in effect, a clutch for disengaging the driving shaft 11, which is an important feature of the present invention.

Assuming now that the operator desires the driven shaft 12 to rotate at a speed less than that of the driving shaft 11, it is merely necessary to displace the valve member 61 to the right, as viewed in Fig. 1 of the drawings, until sufficient fluid is admitted into the pump 50 to produce fluid streams of sufficient magnitude to retard rotation of the rotors 24 and 25 to the desired extent. If the operator desires that the shaft 12 be driven at the same speed as the shaft 11, it is merely necessary to move the valve member 61 farther to the right, as viewed in Fig. 1 of the drawings, to increase the pumping rate to a value sufficient that the fluid streams emanating from the nozzles 40 and 41 prevent rotation of the rotors 24 and 25. Similarly, if the operator desires an overdrive, i. e., if the operator desires that the shaft 12 be driven at a higher speed than the shaft 11, it is merely necessary to move the valve member 61 to a position approaching its fully open position so that the pumping rate is increased sufficiently to produce streams of sufficient magnitudes to reverse the normal rotation of the rotors 24 and 25.

Thus, it will be apparent that by suitably positioning the valve member 61 with respect to the pump inlet 53, any desired speed for the shaft 12 relative to the shaft 11 may be obtained, ranging from a speed of zero to a speed in excess of the speed of the shaft 11. The maximum speed which can be attained for the shaft 12 will, of course, depend upon the capacity of the pump 50, which capacity can be made any desired value.

In addition to the foregoing, another advantage of the present invention is that it provides a flexible connection between the driving and driven shafts 11 and 12 to prevent, or at least minimize, transmission of shock loads from one to the other. Also, it will be apparent that the transmission of the invention automatically adjusts the speed of the driven shaft 12 to compensate for variations in load on the driven shaft, which is another feature of the invention.

In order to permit reversing the direction of rotation of the driven shaft 12 with respect to the driving shaft 11, I provide axially shiftable means 70 for rigidly connecting the shaft 12 and the rotor 25. Rigidly connecting the shaft 12 to the rotor 25 in this manner requires that the shaft 12 rotate in the same direction as the rotor 25, whereby to drive the shaft 12 in the direction of rotation of the intermediate gear. Since the direction of rotation of the intermediate gear is always opposite to that of the driving gear 21, it will be apparent that rotaton of the shaft 12 in a direction opposite to that of the driving gear will result. Consequently, the direction of rotation of the driven shaft 12 will be opposite to that of the driving shaft 11, to permit reversing an automobile, for example.

Figure 3:
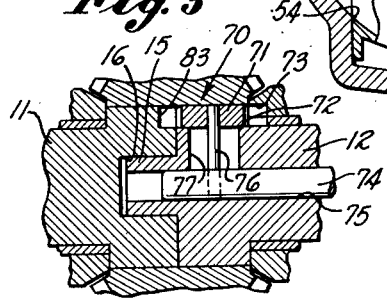
Fig. 3 is a fragmentary sectional view duplicating a portion of Fig. 1 on an enlarged scale.

As best shown in Fig. 3 of the drawings, the axially shiftable means comprises, in the particular construction illustrated, a key 71 which is normally disposed in a keyway 72 in the driven shaft 12, and which is insertable into a keyway 73 in the rotor 25 to rigidly connect the rotor 25 and the shaft 12. The key 71 is controlled by a rod 74 which is reciprocable in a bore 75 in the driven shaft 12, the key being connected to the rod by a pin 76 which is movable in a slot 77 in the shaft 12. The rod 74 is controlled by a collar 78 which is axially movable on the shaft 12 and which is connected to the rod by a pin 79 which is movable in a slot 80 in the shaft 12. The collar 78 may be moved axially of the shaft 12 to move the key 71 into and out of the keyway 73 in any suitable manner, as by a yoke (not shown).

The key 71 is also insertable into a keyway 83 in the shaft 11 to rigidly connect the shaft 12 to the shaft 11 so as to prevent free wheeling whenever desired. Thus, the axially shiftable means 70 is adapted to selectively connect the rotor 25 to the shaft 12 to reverse the direction of rotation of the shaft 12, or to connect the shafts 11 and 12 to prevent free wheeling, which is another feature of the invention.

Figure 4:
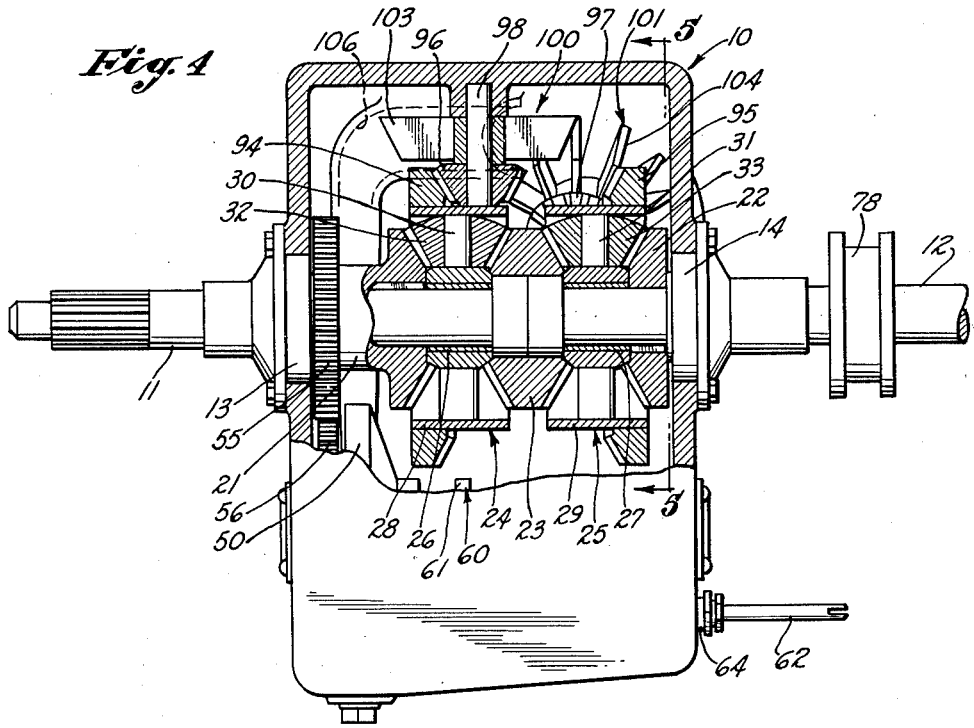
Fig. 4 is a longitudinal sectional view which is similar to Fig. 1 but which illustrates another embodiment of the invention.
Figure 5:
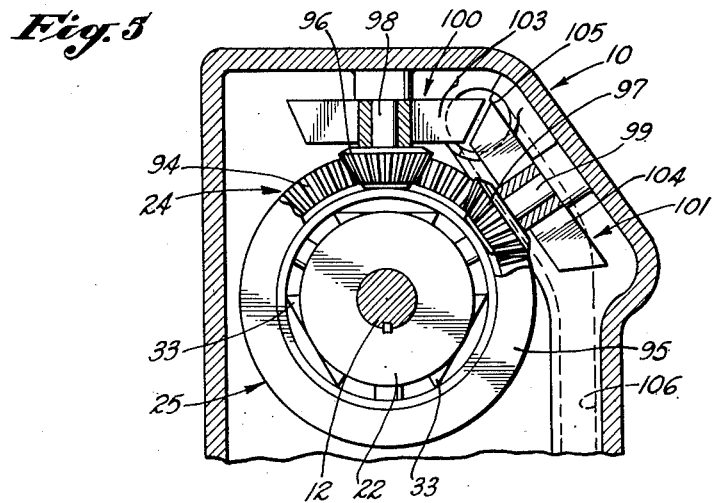
Fig. 5 is a transverse sectional view taken on the broken line 5—5 of Fig. 4.

Referring now to Figs. 4 and 5 of the drawings, the embodiment illustrated therein is similar to that hereinbefore described and identical numerals have been employed to designate corresponding components. In the embodiment presently under consideration, the rotors 24 and 25, instead of being provided with vanes 38 and 39, are provided with gears 94 and 95, these gears being bevel gears in the particular construction illustrated. Meshed with the respective gears 94 and 95 are pinions 96 and 97 which are mounted on shafts 98 and 99, respectively, these shafts being carried by the housing 19. Turbines 100 and 101 are respectively connected to the pinions 96 and 97 so as to drive same, the turbines being provided with blades 103 and 104, respectively.

It will be apparent that by operating the turbines 100 and 101 to rotate the pinions 96 and 97, normal rotation of the rotors 24 and 25 will be retarded, prevented, or reversed, depending on the power input to the turbines. Since the normal directions of rotation of the rotors 24 and 25 are opposite with respect to each other, the pinions 96 and 97 and, hence, the turbines 100 and 101 must be rotated in opposite directions. Consequently, a single fluid stream may be employed to operate the turbines 100 and 101, a single nozzle 105 being provided to direct such a fluid stream against the turbine blades 103 and 104, as best shown in Fig. 5 of the drawings. The nozzle 105 communicates with the outlet of the pump 50 through a passage 106.

The principal advantage of the embodiment illustrated in Figs. 4 and 5 of the drawings over that illustrated in Figs. 1 to 3 thereof is that considerably smaller forces are required to retard, prevent, or reverse rotation of the rotors 24 and 25 because of the increased mechanical advantage provided by opposing normal rotation of the rotors 24 and 25 through the gears 94—96 and 95—97, respectively.

Although I have disclosed two exemplary embodiments of my invention herein for purposes of illustration, it will be understood that I do not intend to be limited specifically thereto since various changes, modifications and substitutions may be incorporated in the specific embodiments disclosed without necessarily departing from the spirit of the invention.

I claim as my invention:

1. In a transmission, the combination of a driving gear, an intermediate gear, a driven gear, a first rotor, first planetary gear means carried by said first rotor and meshed with said driving and intermediate gears, said first gear means being adapted to communicate rotational movement of said driving gear to said first rotor, a second rotor, second planetary gear means carried by said second rotor and meshed with said intermediate driven gears, said second gear means being adapted to communicate rotational movement of said intermediate gear to said driven gear, a first turbine connected to said first rotor, a first stream of fluid, first fluid delivering means for delivering said first stream of fluid to said first turbine to actuate the same to oppose said rotational movement of said first rotor, a second turbine connected to said second rotor, a second stream of fluid, and second fluid delivering means for delivering said second stream of fluid to said second turbine to actuate the same, to oppose said rotational movement of said second rotor, said first fluid delivering means including first nozzle means for directing said first stream of fluid to said first turbine, and said second fluid delivering means including second nozzle means for directing said second stream of fluid to said second turbine, said first and second fluid delivering means including in addition, a pump, having an inlet and an outlet, means for connecting the outlet of said pump to said first and second nozzle means, valve means controlling the inlet of said pump to control the magnitudes of said first and second fluid streams, and actuating means for said pump, said actuating means for said pump comprising gearing connecting said pump to said driving gear.

2. In a transmission, the combination of a driving gear, an intermediate gear, a driven gear, a first rotor, first planetary gear means carried by said first rotor and meshed with said driving and intermediate gears, said first gear means being adapted to communicate rotational movement of said driving gear to said first rotor, a second rotor, second planetary gear means carried by said second rotor and meshed with said intermediate and driven gears, said second gear means being adapted to communicate rotational movement of said intermediate gear to said driven gear, a first turbine connected to said first rotor, a first stream of fluid, first fluid delivering means for delivering said first stream of fluid to said first turbine to actuate the same, to oppose said rotational movement of said first rotor, a second turbine connected to said second rotor, a second stream of fluid, and second fluid delivering means for delivering said second stream of fluid to said second turbine to actuate the same, to oppose said rotational movement of said second rotor, and means for selectively connecting said driven gear with said driving gear and said second rotor with said intermediate gear.

3. In a transmission, the combination of a driving gear rotatable about a predetermined axis, an intermediate gear spaced from said driving gear and rotatable about said axis, a driven gear spaced from said intermediate gear and rotatable about said axis, a first rotor disposed between said driving and intermediate gears and rotatable about said axis, a second rotor disposed between said intermediate and driven gears and rotatable about said axis, first planetary gear means carried by and rotatable relative to said first rotor and meshed with said driving and intermediate gears, said driving gear and said first gear means being adapted to cooperate to rotate said first rotor in the direction of rotation of said driving gear and said first gear means and said intermediate gear being adapted to cooperate to rotate said intermediate gear in a direction opposite to the direction of rotation of said driving gear, second planetary gear means carried by and rotatable relative to said second rotor and meshed with said intermediate and driven gears, said intermediate gear and said second gear means being adapted to cooperate to rotate said second rotor in a direction opposite to the direction of rotation of said driving gear, and said second gear means and said driven gear being adapted to cooperate to rotate said driven gear in the direction of rotation of said driving gear, rotation opposing means including a single pump, for opposing rotation of said first rotor in the direction of rotation of said driving gear and for opposing rotation of said second rotor in a direction opposite to the direction of rotation of said driving gear, and axially shiftable means for selectively connecting said driven gear with said driving gear and said second rotor with said intermediate gear.

ARTHUR B. WISER.

References Cited in the file of this patent

UNITED STATES PATENTS

| Number | Name | Date |
|---|---|---|
| 668,512 | Freitag | Feb. 19, 1901 |
| 1,901,265 | Schneider | Mar. 14, 1933 |
| 2,130,528 | Alexander | Sept. 20, 1938 |
| 2,153,997 | Verderber et al. | Apr. 11, 1939 |
| 2,187,737 | Gregory | Jan. 23, 1940 |
| 2,534,104 | Chiville | Dec. 12, 1950 |

FOREIGN PATENTS

| Number | Country | Date |
|---|---|---|
| 141,509 | Switzerland | Aug. 15, 1930 |
| 242,828 | Great Britain | Nov. 19, 1925 |
| 340,896 | Germany | Sept. 21, 1921 |
| 381,549 | Great Britain | Sept. 29, 1932 |